US012795301B2

(12) United States Patent
Zhang et al.

(10) Patent No.: US 12,795,301 B2
(45) Date of Patent: Nov. 10, 2026

(54) SPEAKER

(71) Applicant: AAC Microtech (Changzhou) Co., Ltd., Changzhou (CN)

(72) Inventors: Fan Zhang, Changzhou (CN); Weiwei Tao, Changzhou (CN); Xin Jin, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 135 days.

(21) Appl. No.: 18/757,367

(22) Filed: Jun. 27, 2024

(65) Prior Publication Data

US 2025/0301263 A1 Sep. 25, 2025

Related U.S. Application Data

(63) Continuation of application No. PCT/CN2024/082628, filed on Mar. 20, 2024.

(51) Int. Cl.

| | |
|---|---|
| ***H04R 9/04*** | (2006.01) |
| ***H04R 1/06*** | (2006.01) |
| ***H04R 7/12*** | (2006.01) |
| ***H04R 7/18*** | (2006.01) |
| ***H04R 9/02*** | (2006.01) |
| ***H04R 9/06*** | (2006.01) |

(52) U.S. Cl.

CPC ............... *H04R 9/045* (2013.01); *H04R 1/06* (2013.01); *H04R 7/127* (2013.01); *H04R 7/18* (2013.01); *H04R 9/025* (2013.01); *H04R 9/06* (2013.01); *H04R 2400/11* (2013.01)

(58) Field of Classification Search

CPC ... H04R 7/04; H04R 1/24; H04R 1/22; H04R 9/063; H04R 9/06; H04R 9/025; H04R 9/02

See application file for complete search history.

(56) References Cited

U.S. PATENT DOCUMENTS

| | | | | |
|---|---|---|---|---|
| 2018/0027333 A1* | 1/2018 | Mao | H04R 7/127 381/398 |
| 2020/0204923 A1* | 6/2020 | Song | H04R 7/16 |
| 2022/0174381 A1* | 6/2022 | Jin | H04R 7/04 |
| 2022/0174384 A1* | 6/2022 | Song | H04R 1/026 |
| 2022/0210569 A1* | 6/2022 | Tao | H04R 9/025 |
| 2022/0295173 A1* | 9/2022 | Sato | H04R 9/027 |
| 2022/0360904 A1* | 11/2022 | Xiao | H04R 9/06 |

(Continued)

*Primary Examiner* — Carolyn R Edwards
*Assistant Examiner* — Julie X Dang
(74) *Attorney, Agent, or Firm* — Wiersch Law Group

(57) ABSTRACT

A speaker is disclosed. The speaker includes a diaphragm, a voice coil and a skeleton connecting the diaphragm and the voice coil. The skeleton includes a flat part fixed to the diaphragm and a first extension part extending from an inner edge of the flat part. The first extension part includes a first part bending from the flat part and extending in a direction far away from the diaphragm, and a second part bending from the first part and extending in a direction far away from the flat part. The voice coil is fixed to the second part. The first extension part further includes a third part bending from at least part of the second part and extending in a direction far away from the voice coil. The speaker can protect the voice coil from being scratched by the skeleton.

9 Claims, 7 Drawing Sheets

(56) References Cited

U.S. PATENT DOCUMENTS

| | | | | |
|---|---|---|---|---|
| 2023/0209272 | A1* | 6/2023 | Hui | H04R 9/025<br>381/412 |
| 2023/0247363 | A1* | 8/2023 | Chen | H04R 9/06<br>381/190 |

* cited by examiner

A-A

SPEAKER

FIELD OF THE PRESENT DISCLOSURE

The present disclosure relates to electroacoustic transducers, in particular to a speaker.

DESCRIPTION OF THE RELATED ART

With the development of science and technology, portable electronic products, such as mobile phones, handheld game consoles, navigation devices and handheld multimedia entertainment devices, are widely used in people's daily life. Since emitting sounds is an essential function of these portable electronic products and the quality of sounds directly affects user's experiences when using these portable electronic products, the requirements for speakers used therein are getting higher and higher.

A speaker in the related art includes a frame, a vibration system fixed to the frame and a magnetic circuit system driving the vibration system for generating sounds. The vibration system includes a diaphragm fixed to the frame, a voice coil, and a skeleton connecting the diaphragm and the voice coil. However, the part of the skeleton contacting with the voice coil tends to have sharp edges or burrs. When the vibration system vibrates, the sharp edges or burrs can easily scratch the voice coil, especially the corners of the voice coil, thereby causing damage to the insulation, or even the center conductor of the voice coil, which affects the normal operation of the voice coil, or makes the voice coil broken.

Thus, it is necessary to provide a novel speaker to solve the problems.

SUMMARY

An objective of the present disclosure is to overcome the above problems and provide a speaker which can protect the voice coil from being scratched by the skeleton.

In order to achieve the objective mentioned above, the present disclosure discloses a speaker including a frame, a vibration system fixed to the frame and a magnetic circuit system driving the vibration system for generating sounds. The vibration system includes a diaphragm fixed to the frame, a voice coil, and a skeleton connecting the diaphragm and the voice coil. The skeleton includes a flat part fixed to the diaphragm and a first extension part extending from an inner edge of the flat part. The first extension part includes a first part bending from the flat part and extending in a direction far away from the diaphragm, and a second part bending from the first part and extending in a direction far away from the flat part. The voice coil is fixed to the second part. The first extension part further includes a third part bending from at least part of the second part and extending in a direction far away from the voice coil.

As an improvement, the first extension part is provided with two long axis sides opposite to each other, two short axis sides opposite to each other, and four corners connecting the two long axis sides and the two short axis sides. The third part is provided on at least one of the two long axis sides, the two short axis sides and the four corners.

As an improvement, the magnetic circuit system includes a bottom plate, a main magnetic member fixed to the bottom plate and a secondary magnetic member disposed around the main magnetic member for forming a magnetic gap. The voice coil locates in the magnetic gap. The main magnetic member includes a first main magnet, a main yoke and a second main magnet stacked in sequence from the bottom plate. The secondary magnetic member includes a secondary magnet fixed to the bottom plate and a secondary yoke attached to the secondary magnet. The secondary yoke is fixed to the frame.

As an improvement, the vibration system further includes a flexible circuit board spaced apart from the diaphragm. The skeleton further includes a second extension part extending from an outer edge of the flat part toward the bottom plate. The voice coil is provided with a coil lead electrically connecting with the flexible circuit board. The flexible circuit board includes a main body part fixed to the second extension part, an outer connecting part extending outward from an outer edge of the main body part and an inner connecting part extending from an inner edge of the main body part to the flat part. The inner connecting part is fixed to the flat part and electrically connects with the voice coil through the coil lead.

As an improvement, a gap is provided on at least one of the two long axis sides and the two short axis sides for the coil lead passing through.

As an improvement, a containing groove is provided on the secondary yoke for containing at least part of the coil lead.

As an improvement, the diaphragm includes an inner suspension fixed to the second main magnet, an outer suspension fixed to the frame, and a dome connecting the inner suspension and the outer suspension and covering the flat part. The dome and the flat part are glued together.

As an improvement, the flat part has a gluing surface glued to the dome and is provided with two glue storage grooves depressed from the gluing surface along a vibration direction of the diaphragm, and the two glue storage grooves are in a strip shape and respectively locate on both sides of the inner suspension.

As an improvement, an avoidance groove is provided on the bottom plate for avoiding the voice coil.

In the speaker according to the present disclosure, the voice coil is fixed to the second part, and the first extension part further includes a third part bending from at least part of the second part and extending in a direction far away from the voice coil, so as to remove the sharp edges or burrs from the part of the skeleton contacting with the voice coil for protecting the voice coil from being scratched by the sharp edges or burrs of the skeleton.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

REFERENCE NUMBERS

Figure 1:
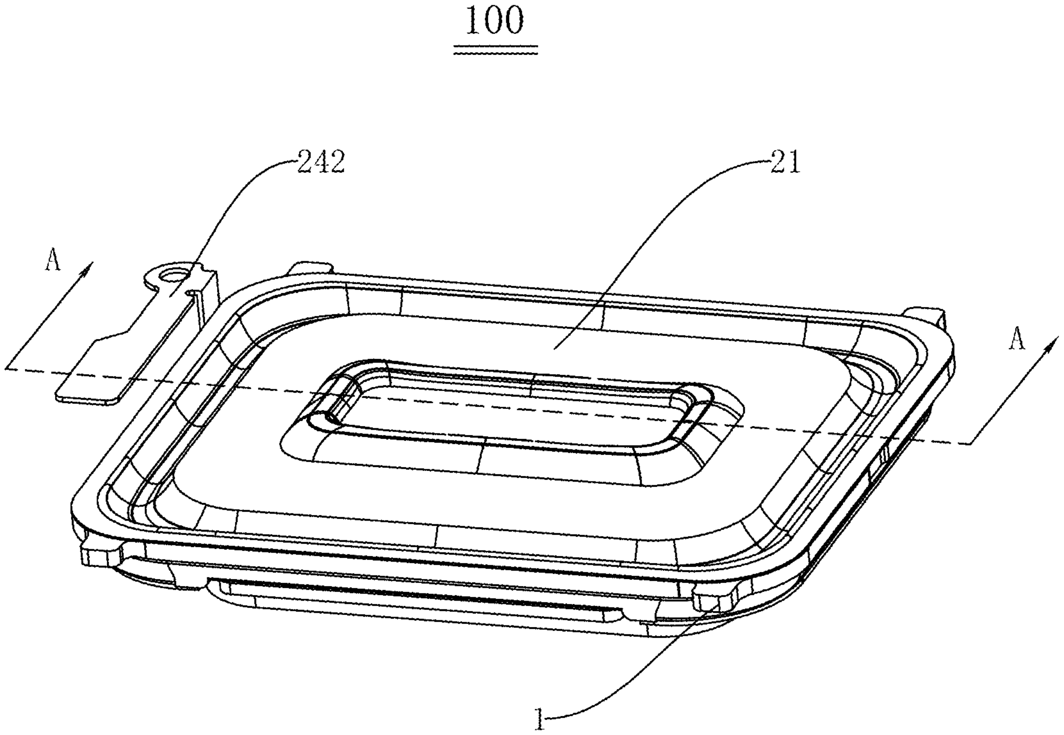
FIG. 1 is an isometric view of a speaker in accordance with an exemplary embodiment of the present disclosure.
Figure 2:
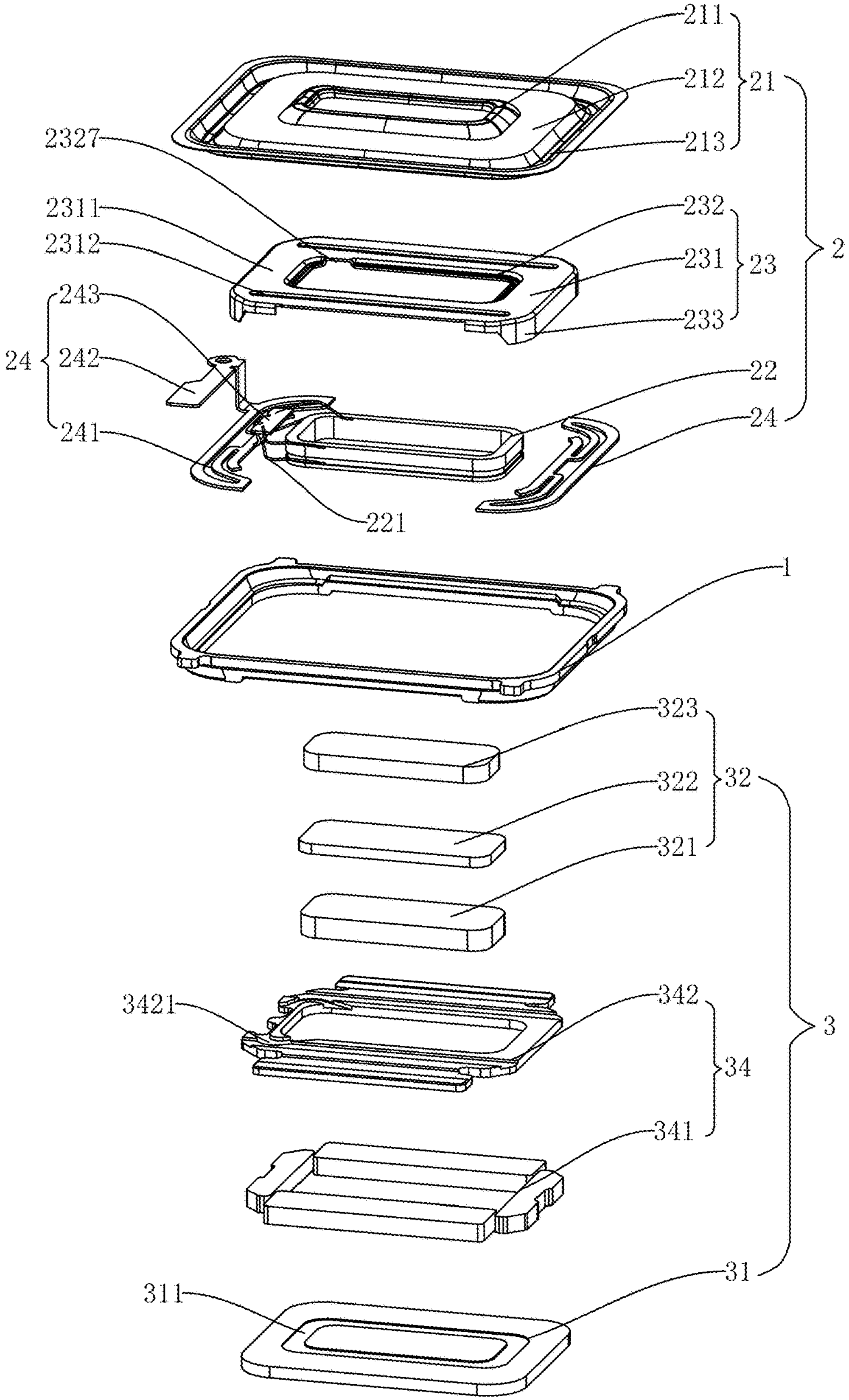
FIG. 2 is an exploded view of the speaker in FIG. 1.
Figure 3:
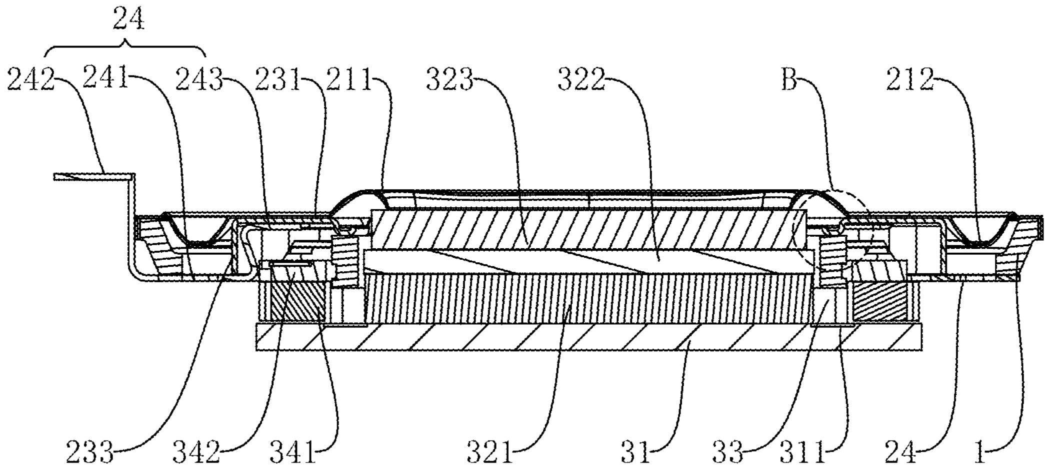
FIG. 3 is a cross-sectional view of the speaker, taken along line A-A in FIG. 1.
Figure 4:
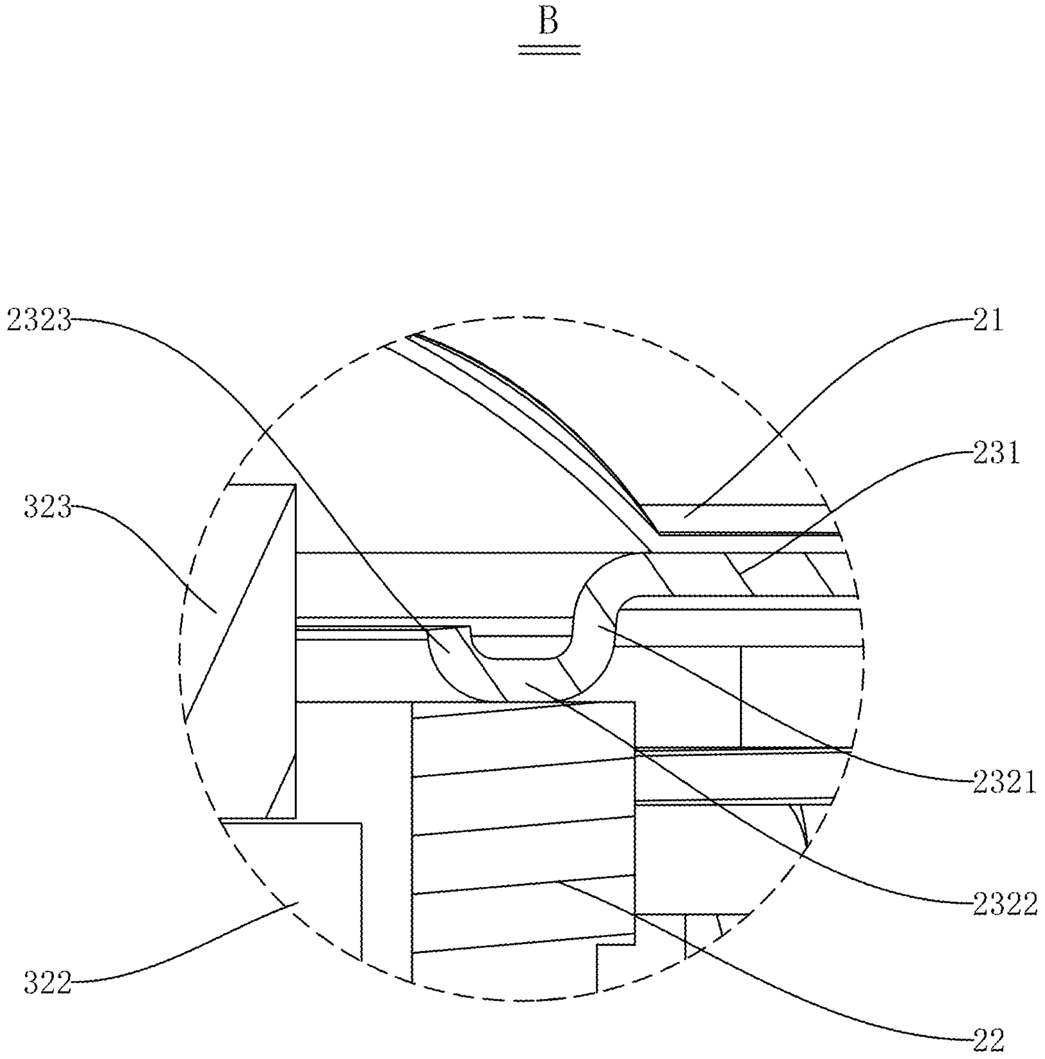
FIG. 4 is an enlarged view of part B in FIG. 3.
Figure 5:
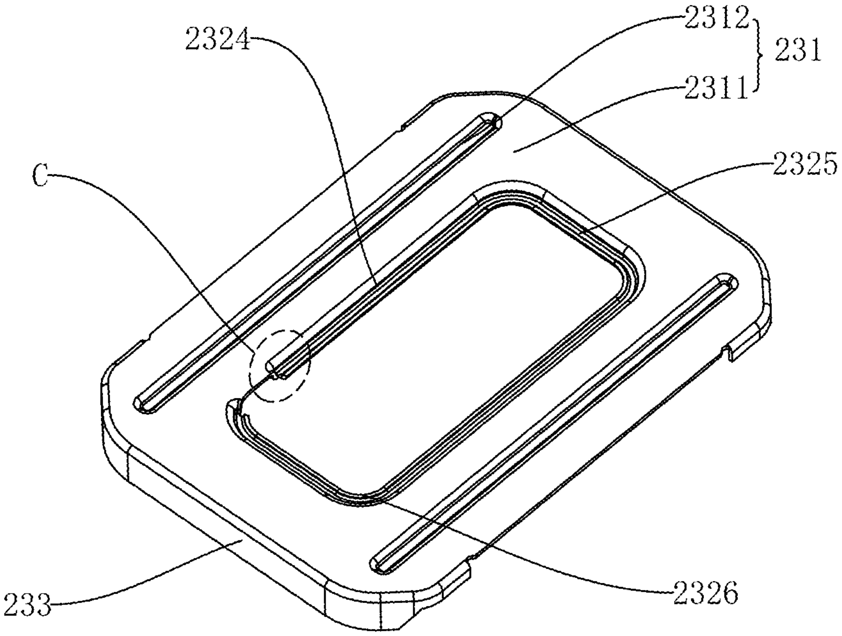
FIG. 5 is an isometric view of a skeleton of the speaker in FIG. 1.
Figure 6:
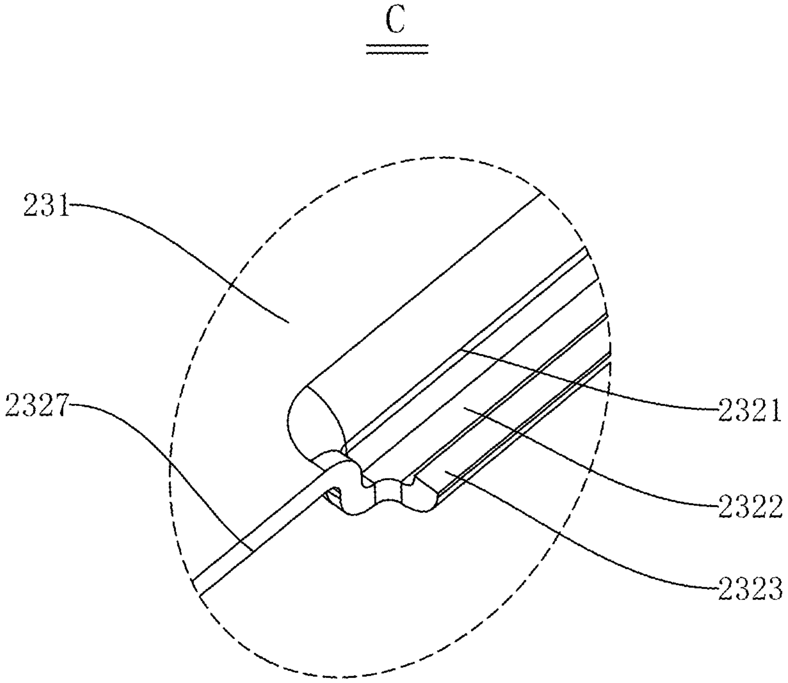
FIG. 6 is an enlarged view of part C in FIG. 5.

100: speaker;

1: frame;

2: vibration system, 21: diaphragm, 211: inner suspension, 212: outer suspension, 213: dome, 22: voice coil, 221: coil lead, 23: skeleton, 231: flat part, 2311: gluing surface, 2312: glue storage groove, 232: first extension part, 2321: first part, 2322: second part, 2323: third part, 2324: long axis side, 2325: short axis side, 2326: corner, 2327: gap, 233: second extension part, 24: flexible circuit board, 241: main body part, 242: outer connecting part, 243: inner connecting part;

3: magnetic circuit system, 31: bottom plate, 311: avoidance groove, 32: main magnetic member, 321: first main magnet, 322: main yoke, 323: second main magnet, 33: magnetic gap, 34: secondary magnetic member, 341: secondary magnet, 342: secondary yoke, 3421: containing groove.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Referring to FIGS. 1-6, the present disclosure discloses a speaker 100. The speaker 100 includes a frame 1, a vibration system 2 fixed to the frame 1 and a magnetic circuit system 3 driving the vibration system 2 for generating sounds. The vibration system 2 includes a diaphragm 21 fixed to the frame 1, a voice coil 22, and a skeleton 23 connecting the diaphragm 21 and the voice coil 22. The skeleton 23 includes a flat part 231 fixed to the diaphragm 21, a first extension part 232 extending from an inner edge of the flat part 231 and a second extension part 233 extending from an outer edge of the flat part 231. The first extension part 232 includes a first part 2321 bending from the flat part 231 and extending in a direction far away from the diaphragm 21, and a second part 2322 bending from the first part 2321 and extending in a direction far away from the flat part 231. The voice coil 22 is fixed to the second part 2322. The first extension part 232 further includes a third part 2323 bending from at least part of the second part 2322 and extending in a direction far away from the voice coil 22.

Figure 7:
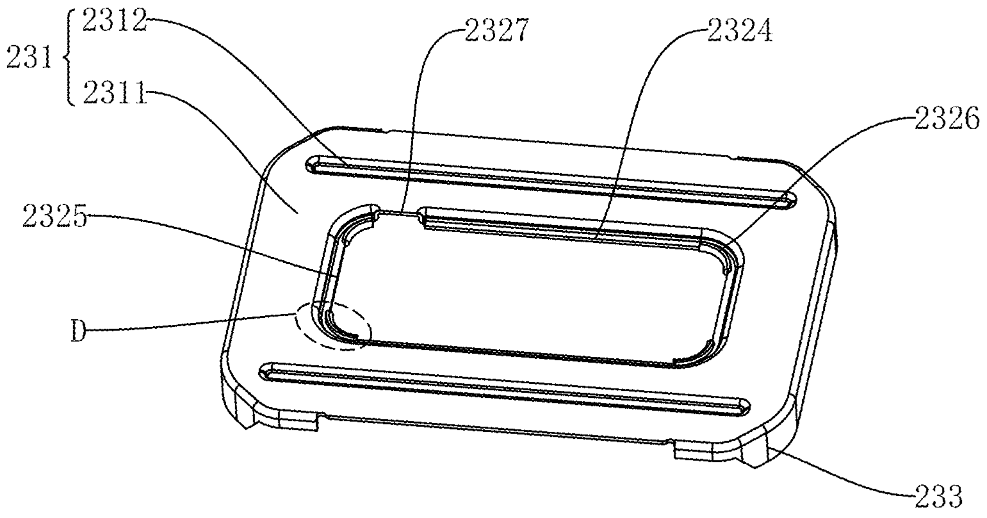
FIG. 7 is an isometric view of a skeleton of another speaker of the present disclosure.
Figure 8:
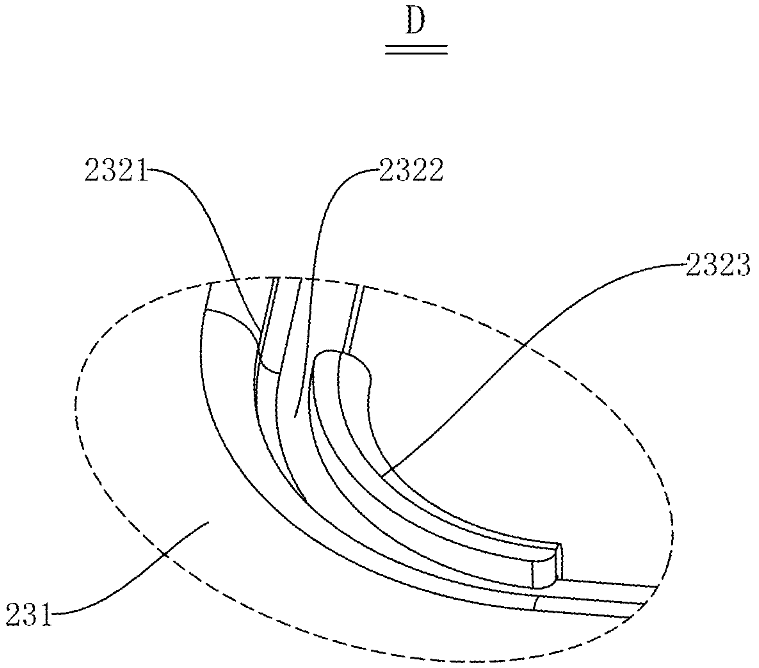
FIG. 8 is an enlarged view of part D in FIG. 7.

The first extension part 232 is provided with two long axis sides 2324 opposite to each other, two short axis sides 2325 opposite to each other, and four corners 2326 connecting the two long axis sides 2324 and the two short axis sides 2325. The third part 2323 is provided on at least one of the two long axis sides 2324, the two short axis sides 2325 and the four corners 2326. In this embodiment, the third part 2323 is provided on the two long axis sides 2324, the two short axis sides 2325 and the four corners 2326. In other embodiments, in order to reduce the material cost as well as the mass of the skeleton 23, the third part 2323 can be only provided on any position corresponding to the vulnerable part of the voice coil 22. Optionally, in one embodiment shown in FIGS. 7-8, the third part 2323 is only provided on the four corners 2326 corresponding to the vulnerable corner parts of the voice coil 22.

The diaphragm 21 includes an inner suspension 211, an outer suspension 212 fixed to the frame 1, and a dome 213 connecting the inner suspension 211 and the outer suspension 212 and covering the flat part 231. The dome 213 and the flat part 231 are glued together.

The flat part 231 has a gluing surface 2311 glued to the dome 213 and is provided with two glue storage grooves 2312 depressed from the gluing surface 2311 along a vibration direction of the diaphragm 21, and the two glue storage grooves 2312 are in a strip shape and respectively locate on both sides of the inner suspension 211. The two glue storage grooves 2312 can improve the strength of the skeleton 23, and also can store the excess glue when gluing the skeleton 23 and the diaphragm 21.

The magnetic circuit system 3 includes a bottom plate 31, a main magnetic member 32 fixed to the bottom plate 31 and a secondary magnetic member 34 disposed around the main magnetic member 32 for forming a magnetic gap 33. The voice coil 22 locates in the magnetic gap 33. An avoidance groove 311 is provided on the bottom plate 31 for avoiding the voice coil 22. The main magnetic member 32 includes a first main magnet 321, a main yoke 322 and a second main magnet 323 stacked in sequence from the bottom plate 31. The inner suspension 211 is fixed to the second main magnet 323. The secondary magnetic member 34 includes a secondary magnet 341 fixed to the bottom plate 31 and a secondary yoke 342 attached to the secondary magnet 341. The secondary yoke 342 is fixed to the frame 1.

Figure 9:
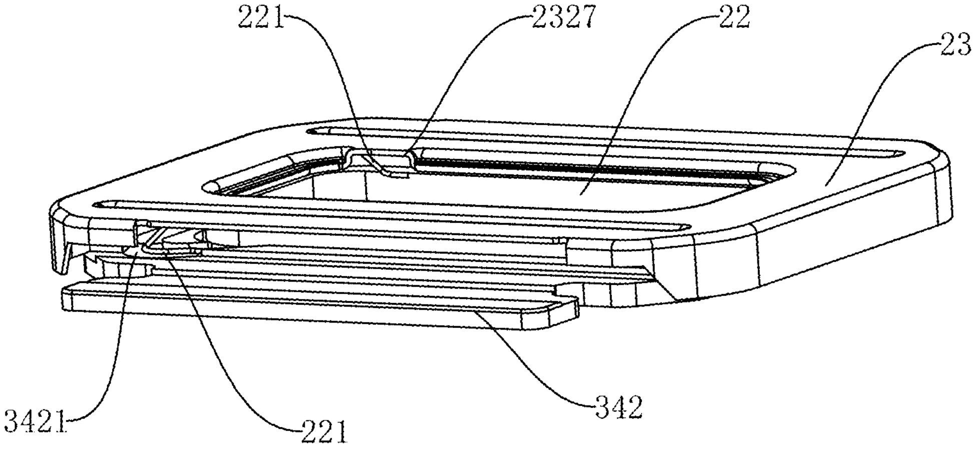
FIG. 9 is an isometric view of an assembly of a voice coil, a skeleton and a secondary yoke of the speaker in FIG. 1.

The vibration system 2 further includes a flexible circuit board 24 spaced apart from the diaphragm 21. The voice coil 22 is provided with a coil lead 221 electrically connecting with the flexible circuit board 24. Referring to FIG. 9 together, a gap 2327 is provided on at least one of the two long axis sides 2324 and the two short axis sides 2325 for the coil lead 221 passing through, and a containing groove 3421 is provided on the secondary yoke 342 for containing at least part of the coil lead 221. The flexible circuit board 24 includes a main body part 241 fixed to the second extension part 233 extending toward the bottom plate 31, an outer connecting part 242 extending outward from an outer edge of the main body part 241 and an inner connecting part 243 extending from an inner edge of the main body part 241 to the flat part 231. The inner connecting part 243 is fixed to the flat part 231 and electrically connects with the voice coil 22 through the coil lead 221. The flexible circuit board 24 also can effectively inhibit the lateral vibration of the diaphragm 21 and improve the reliability and stability of the vertical vibration of the diaphragm 21.

In the speaker 100 according to the present disclosure, the voice coil 22 is fixed to the second part 2322, and the first extension part 232 further includes a third part 2323 bending from at least part of the second part 2322 and extending in a direction far away from the voice coil 22, so as to remove the sharp edges or burrs from the part of the skeleton 23 contacting with the voice coil 22 for protecting the voice coil 22 from being scratched by the sharp edges or burrs of the skeleton 23. The third part 2323 can bend from the entire second part 2322, or from any partial position of the second part 2322 corresponding to the vulnerable part of the voice coil 22, these can be adapted to the actual situation, as long as the voice coil 22 can be protected from being scratched by the sharp edges or burrs of the skeleton 23.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A speaker, comprising:

a frame;

a vibration system fixed to the frame; and a magnetic circuit system driving the vibration system for generating sounds, wherein the vibration system comprises a diaphragm fixed to the frame, a voice coil, and a skeleton connecting the diaphragm and the voice coil; the skeleton comprises a flat part fixed to the diaphragm and a first extension part extending from an inner edge of the flat part; the first extension part comprises a first part bending from the flat part and extending in a direction far away from the diaphragm, and a second part bending from the first part and extending in a direction far away from the flat part; the voice coil is fixed to the second part; the second part has an inner edge which extends around a winding axis of the voice coil; the first extension part further comprises a third part bending from at least part of the inner edge of the second part and extending in a direction far away from the voice coil; the third part is opposite to and spaced apart from the first part.

2. The speaker as described in claim 1, wherein the first extension part is provided with two long axis sides opposite to each other, two short axis sides opposite to each other, and four corners connecting the two long axis sides and the two short axis sides; the third part is provided on at least one of the two long axis sides, the two short axis sides and the four corners.

3. The speaker as described in claim 2, wherein the magnetic circuit system comprises a bottom plate, a main magnetic member fixed to the bottom plate and a secondary magnetic member disposed around the main magnetic member for forming a magnetic gap; the voice coil locates in the magnetic gap; the main magnetic member comprises a first main magnet, a main yoke and a second main magnet stacked in sequence from the bottom plate; the secondary magnetic member comprises a secondary magnet fixed to the bottom plate and a secondary yoke attached to the secondary magnet; the secondary yoke is fixed to the frame.

4. The speaker as described in claim 3, wherein the vibration system further comprises a flexible circuit board spaced apart from the diaphragm; the skeleton further comprises a second extension part extending from an outer edge of the flat part toward the bottom plate; the voice coil is provided with a coil lead electrically connecting with the flexible circuit board; the flexible circuit board comprises a main body part fixed to the second extension part, an outer connecting part extending outward from an outer edge of the main body part and an inner connecting part extending from an inner edge of the main body part to the flat part; the inner connecting part is fixed to the flat part and electrically connects with the voice coil through the coil lead.

5. The speaker as described in claim 4, wherein a gap is provided in the skeleton for the coil lead passing through.

6. The speaker as described in claim 4, wherein a containing groove is provided on the secondary yoke for containing at least part of the coil lead.

7. The speaker as described in claim 3, wherein the diaphragm comprises an inner suspension fixed to the second main magnet, an outer suspension fixed to the frame, and a dome connecting the inner suspension and the outer suspension and covering the flat part; the dome and the flat part are glued together.

8. The speaker as described in claim 7, wherein the flat part has a gluing surface glued to the dome and is provided with two glue storage grooves depressed from the gluing surface along a vibration direction of the diaphragm, and the two glue storage grooves are in a strip shape and respectively locate on both sides of the inner suspension.

9. The speaker as described in claim 7, wherein an avoidance groove is provided on the bottom plate for avoiding the voice coil.

* * * * *